F. G. SCOZZAFAVA.
PISTON RING.
APPLICATION FILED JAN. 19, 1921.
1,419,413.
Patented June 13, 1922.
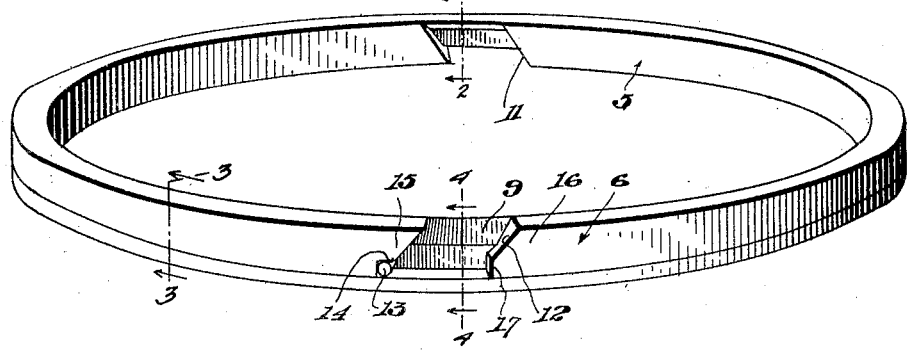
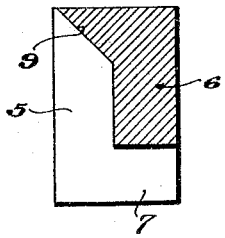
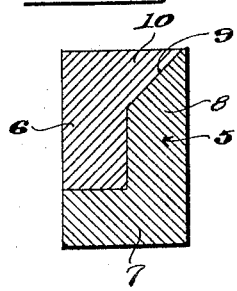   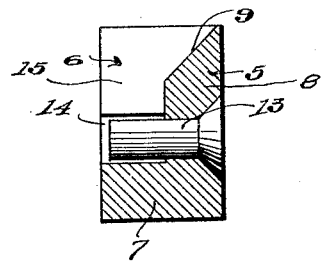
Fred G. Scozzafava
Inventor
By Lancaster & Allwine
their Attorneys

UNITED STATES PATENT OFFICE.

FRED GABRIEL SCOZZAFAVA, OF GOUVERNEUR, NEW YORK.

PISTON RING.

1,419,413.  Specification of Letters Patent.  Patented June 13, 1922.

Application filed January 19, 1921. Serial No. 438,382.

*To all whom it may concern:*

Be it known that I, FRED G. SCOZZAFAVA, a citizen of the United States, residing at Gouverneur, in the county of St. Lawrence and State of New York, have invented certain new and useful Improvements in Piston Rings, of which the following is a specification.

This invention relates to piston rings, particularly designed for use upon the pistons of internal combustion engines, and an object of this invention is to provide a piston ring constructed to prevent gaps therein, rendering the engine gas tight and consequently increasing the power of the engine and saving expense in the operation thereof by permitting of the utilization of the maximum explosive proclivities of the fuel within the cylinder, and against the piston, and preventing any escape of the exploding gases past the piston.

Another object of this invention is to provide a two-part piston ring, each section of which is split, and one wherein the surfaces of the sections of the ring each form substantially the entire upper and lower surface of the ring, and also to provide means for preventing the gaps in the ring section from coming in alignment with each other, which means comprises a pin carried by the inner section engageable with a suitable recess formed in one end of the outer section, whereby the ends of the outer section may be moved into engagement with each other by contracting action on the ring section to permit the proper fitting or filing of the ends of the outer section, to cause it to properly fit the piston upon which it is mounted.

Other objects of the invention will appear in the following detailed description taken in connection with the accompanying drawings, forming a part of this specification, and in which drawings:

Figure 1 is a perspective view of the improved piston ring showing the section.

Figure 2 is a section on the line 2—2 of Figure 1.

Figure 3 is a cross section taken on the line 3—3 of Figure 1, and

Figure 4 is a section on the line 4—4 of Figure 1.

Referring more particularly to the drawings, wherein like characters indicate like and corresponding parts throughout the several views, the improved piston ring is formed of an inner section 5 and an outer section 6, each formed of any suitable material. The inner section 5 is provided with a relatively wide base portion 7 which extends throughout the entire width of the piston ring structure, and with an upstanding annular portion 8 of substantially one half the thickness or width of the ring, the upper end of which upstanding portion is bevelled as shown at 9 terminating in a substantially sharp edge at the upper inner edge of the piston ring structures. The outer section 6 is provided with an annular outer projection 10 extending inwardly on its upper edge, the inner upper surface of which is bevelled, for snugly fitting against the bevelled surface 9 of the upper edge of the upstanding portion 8, of the lower or inner section 5. The main portion of the section 6 is of such thickness that it, together with the upstanding portion 8 of the section 5 are equal in width to the width of the base 7, as clearly shown in the drawings. Each of the sections 5 and 6 are split as shown at 11 and 12 respectively, in Figure 1 of the drawings, and in assembling the sections in ring formation the split 11 is positioned at one side of the ring, while the split 12 is substantially diametrically opposite therefrom. The ring section 6 is prevented from moving circumferentially about the inner section 5, by a radially extending pin 13, which is carried by the inner section 5, and is adapted to rest in a recess 14, formed in the end of the section 6. This recess 14 is formed in the end 15 at its lower edge, and the end 16 of the outer section 6 of the ring structure is provided with a straight portion 17, adapted to correspond with the recess 14 and being of substantially the same height as the recess, thus permitting the contracting of the ring section 6 until the angled portions of the ends 15 and 16 are moved into engagement with each other, without interfering with the pin 13, so as to permit the proper adjustment of the ring 6 about a piston upon which it is to be mounted, so that if necessary the angled surfaces of the ends 15 and 16 may be filed to properly present these surfaces with the necessary space therebetween to allow for the expansion of the metal of which the ring is made, when the engine becomes heated.

The upper edge connection between the sections 5 and 6 is such, that when the ring is attached to a piston it will be near the inner surface of the groove in the piston, and the joint being formed of the engagement of the bevelled sections of the ring, the passage of carbon between the ring sections will be practically eliminated, and a firm and secure, as well as a gas tight connection between the sections will be maintained at all times.

Changes in details may be made without departing from the spirit of this invention, but;

I claim:

1. A piston ring comprising inner and outer cooperating rings, said inner ring including a base extending entirely across the width of the piston ring, and an upstanding portion having its upper edge bevelled, a lateral extension on said outer ring and having its under surface bevelled for facial engagement with the bevelled upper edge of the inner section, the upper edge of said outer section extending substantially entirely across the width of the ring, said inner and outer rings being split, the facing ends of the outer ring being bevelled, a radially extending pin carried by said inner ring, said outer ring provided with a recess extending inwardly from one of its bevelled ends at the lower edge thereof, and being adapted to receive said radial pin therein to prevent circumferential relative movement of the inner and outer rings.

2. A piston ring comprising inner and outer cooperating ring sections, said inner ring section including a base extending entirely across the width of the piston ring, and an upstanding portion having its upper edge bevelled, the upper surface of said base and the adjacent side surface of said upstanding portion being at right angles to each other, said outer ring section having a lateral extension formed upwardly thereon, the under surface of which is bevelled for facial engagement with the bevelled upper edge of the inner ring section, the lower surface and inner side of said outer section being substantially at right angles to each other and adapted for engagement with the upper surface of said base and outer side of the inner section respectively, both of said ring sections being split, and means for retaining said rings in definite relation against relative rotation.

FRED GABRIEL SCOZZAFAVA.